Figure 1:
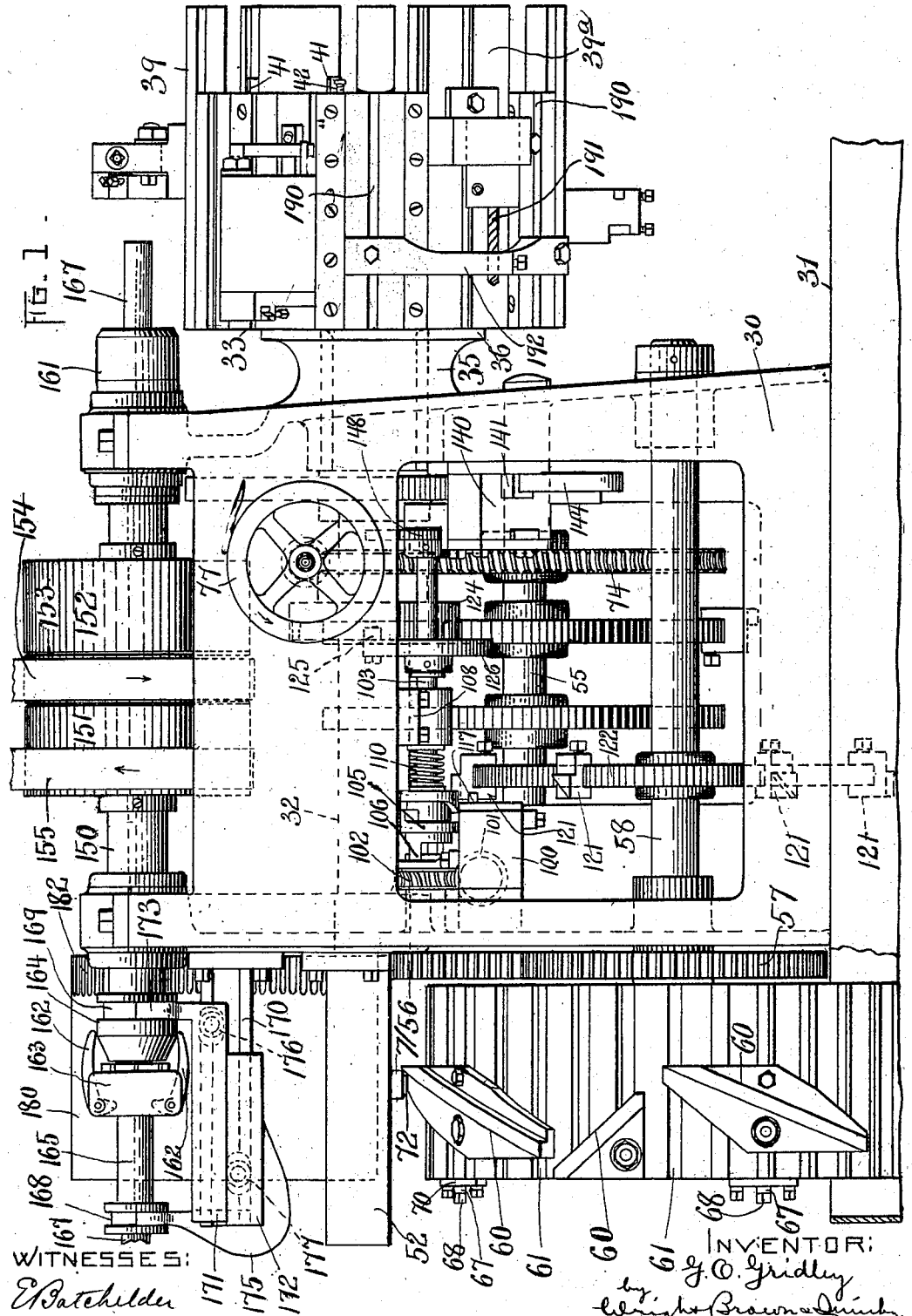

No. 725,438. PATENTED APR. 14, 1903.
G. O. GRIDLEY.
BAR WORKING MACHINE.
APPLICATION FILED JAN. 2, 1902.

NO MODEL. 11 SHEETS—SHEET 1.

WITNESSES:
INVENTOR:

No. 725,438. PATENTED APR. 14, 1903.
G. O. GRIDLEY.
BAR WORKING MACHINE.
APPLICATION FILED JAN. 2, 1902.
NO MODEL. 11 SHEETS—SHEET 4.

WITNESSES: INVENTOR:

No. 725,438. PATENTED APR. 14, 1903.
G. O. GRIDLEY.
BAR WORKING MACHINE.
APPLICATION FILED JAN. 2, 1902.
NO MODEL. 11 SHEETS—SHEET 5.

WITNESSES: INVENTOR.

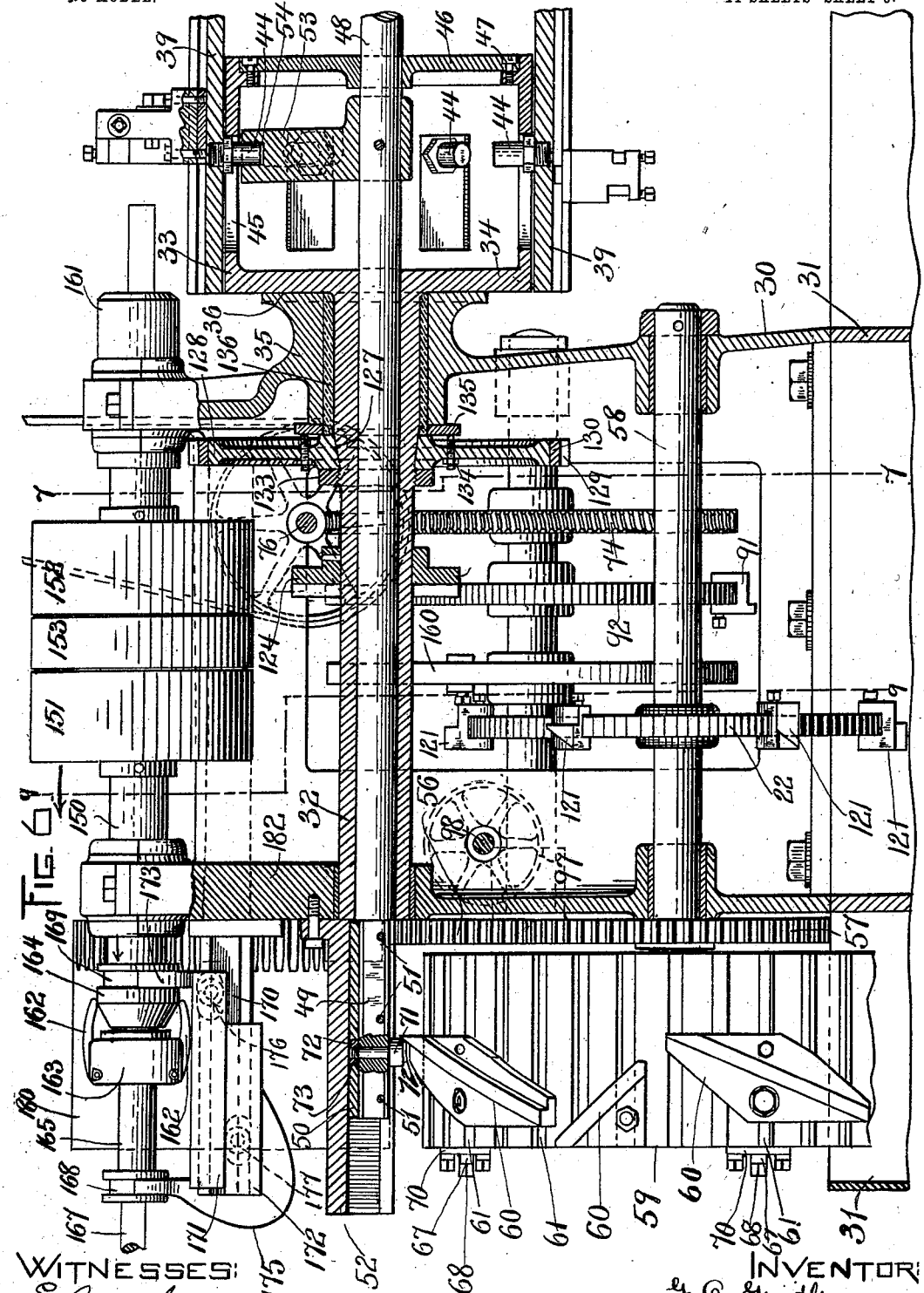

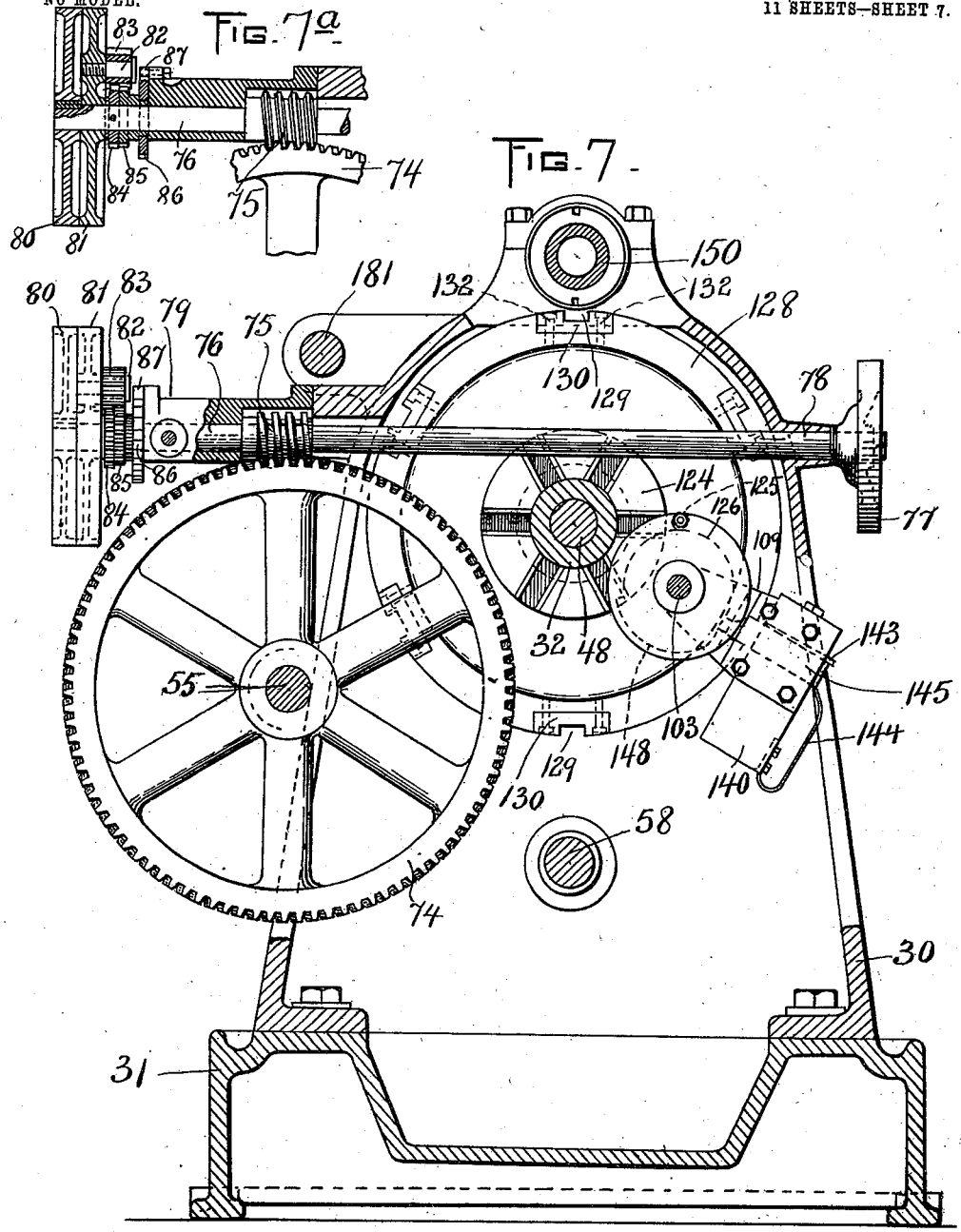

No. 725,438. PATENTED APR. 14, 1903.
G. O. GRIDLEY.
BAR WORKING MACHINE.
APPLICATION FILED JAN. 2, 1902.
NO MODEL. 11 SHEETS—SHEET 8.
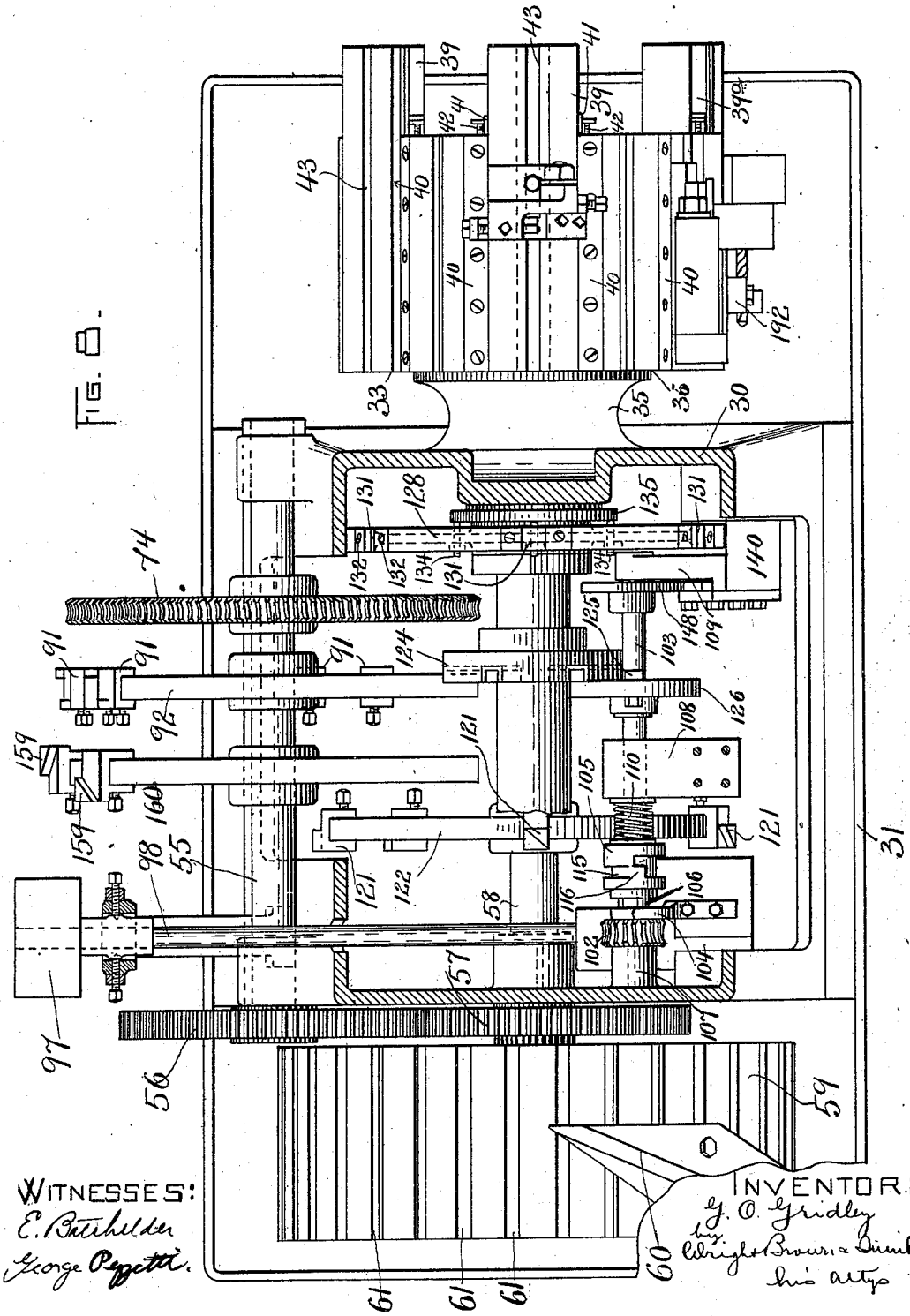
WITNESSES:
INVENTOR:

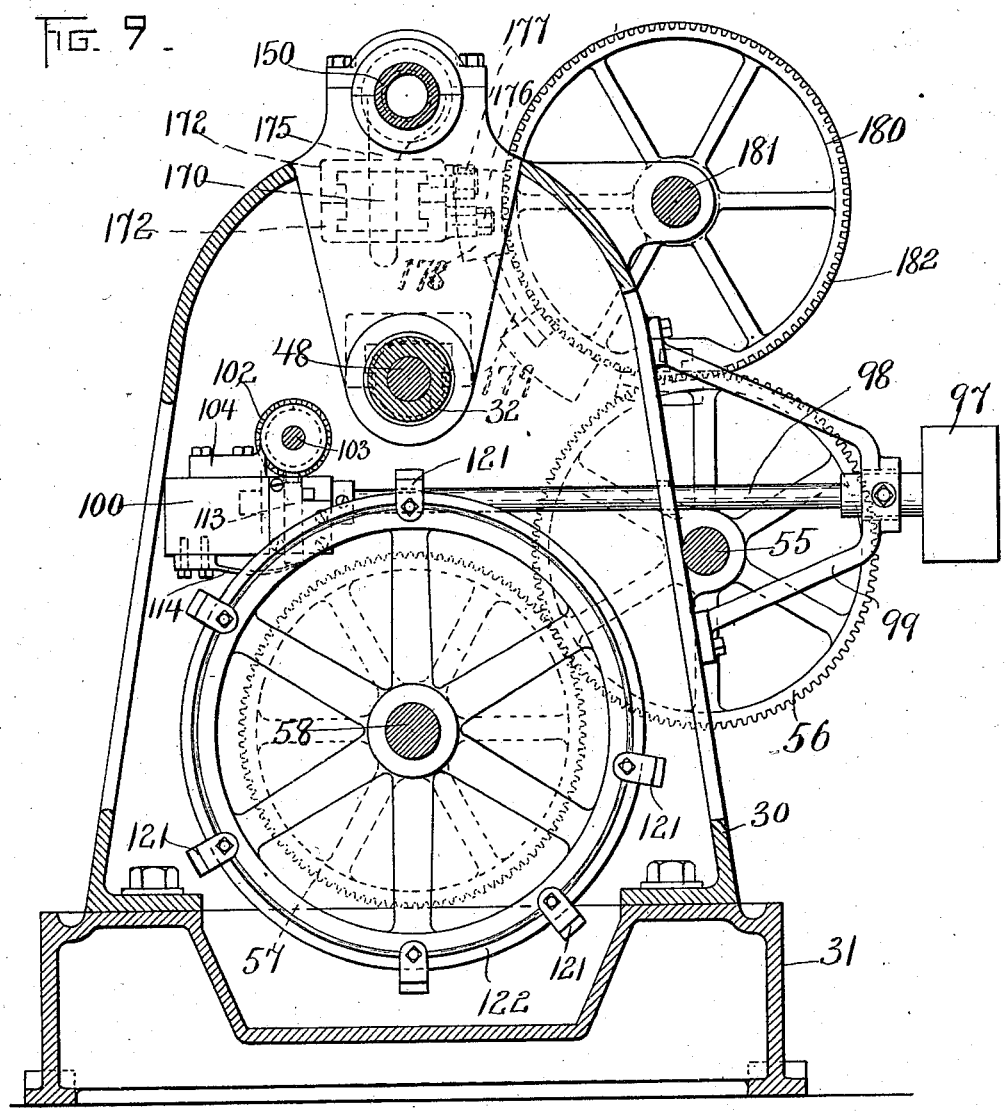

No. 725,438. PATENTED APR. 14, 1903.
G. O. GRIDLEY.
BAR WORKING MACHINE.
APPLICATION FILED JAN. 2, 1902.
NO MODEL. 11 SHEETS—SHEET 10.
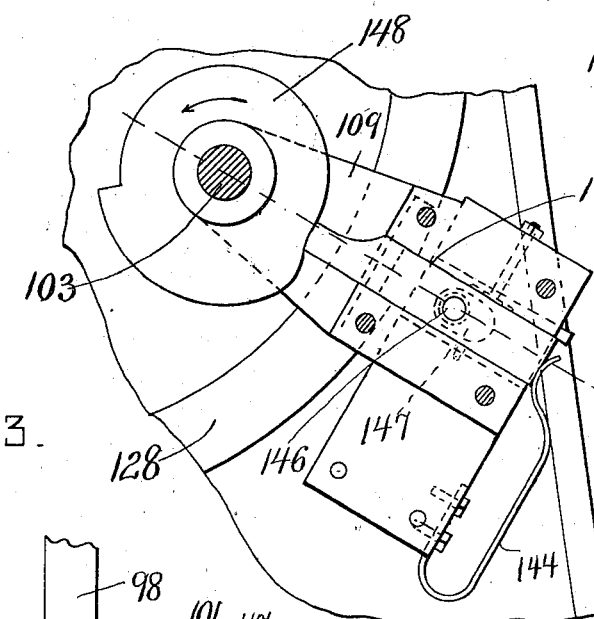
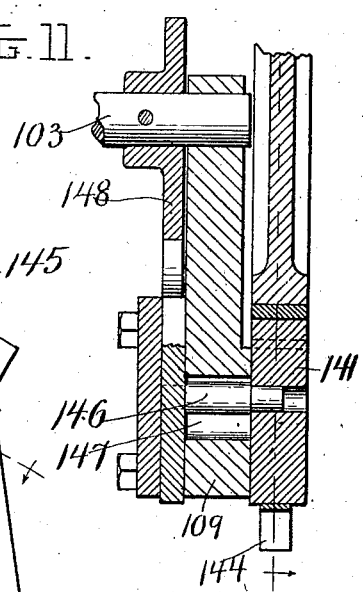
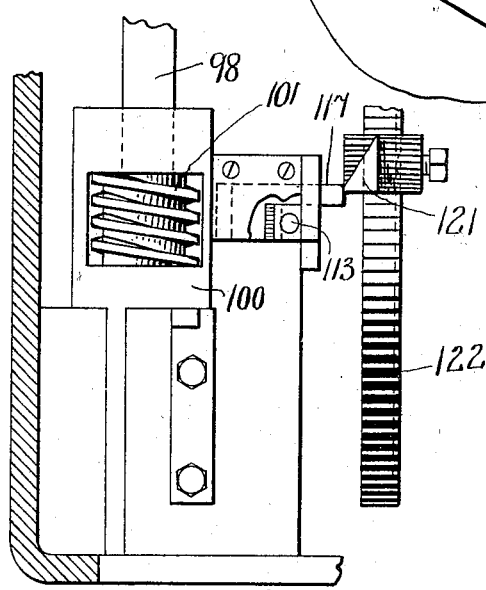
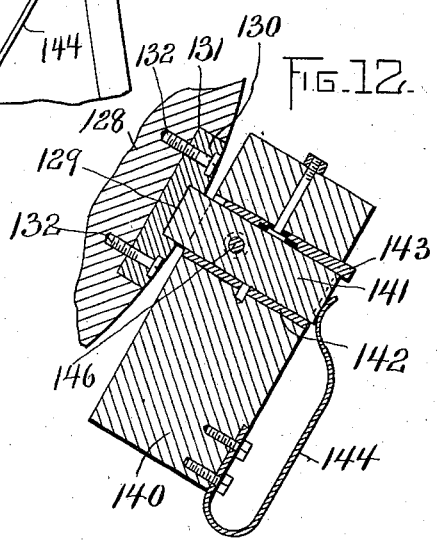
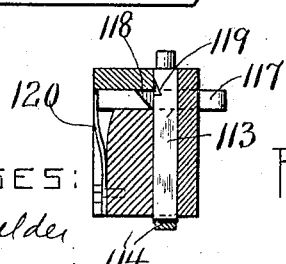
WITNESSES:
E. Batchelder
George Pezzetti
INVENTOR:
G. O. Gridley
by Knight Brown & Quinby
his attys No. 725,438.
PATENTED APR. 14, 1903.
G. O. GRIDLEY.
BAR WORKING MACHINE.
APPLICATION FILED JAN. 2, 1902.
NO MODEL.
11 SHEETS—SHEET 11.
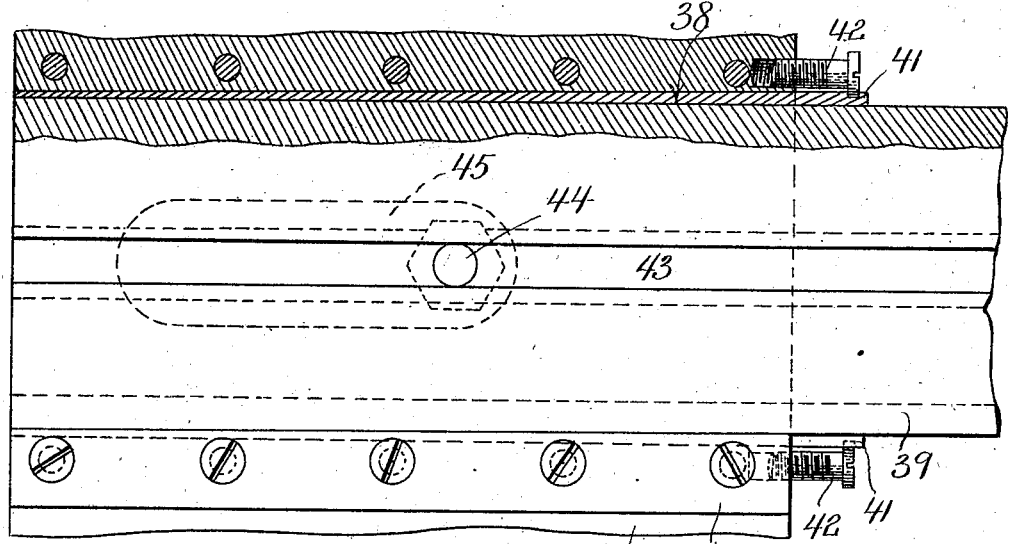
Fig. 15.
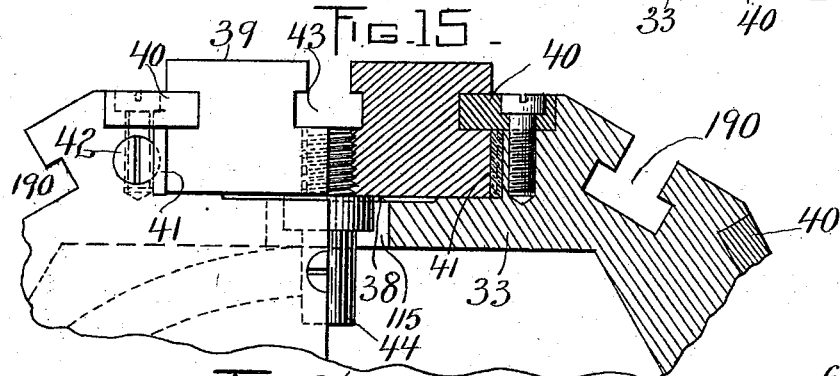
Fig. 16.
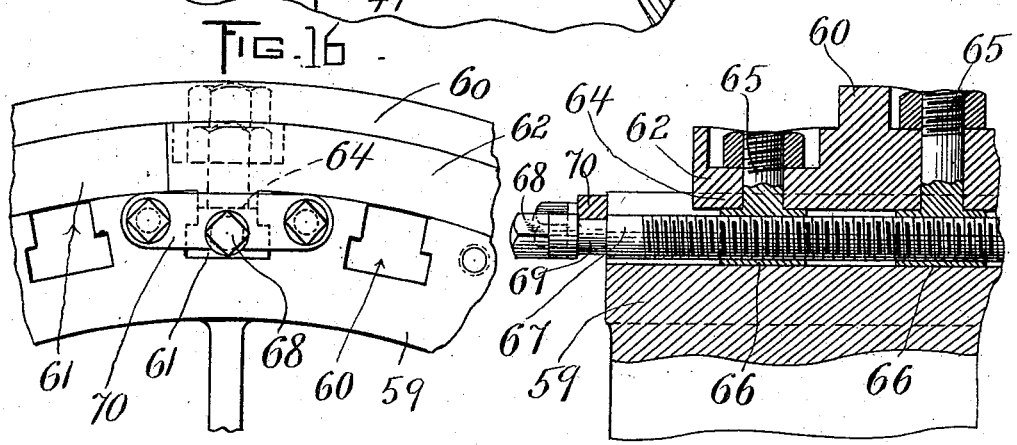
Fig. 17.
Fig. 18.
WITNESSES:
E. Batchelder
George Pizzetti
INVENTOR
G. O. Gridley
by Wright, Brown & Quinby
his attys

UNITED STATES PATENT OFFICE.

GEORGE O. GRIDLEY, OF WINDSOR, VERMONT.

BAR-WORKING MACHINE.

SPECIFICATION forming part of Letters Patent No. 725,438, dated April 14, 1903.

Application filed January 2, 1902. Serial No. 88,061. (No model.)

*To all whom it may concern:*

Be it known that I, GEORGE O. GRIDLEY, of Windsor, in the county of Windsor and State of Vermont, have invented certain new and useful Improvements in Bar-Working Machines, of which the following is a specification.

This invention has relation, broadly, to metal-working machines and in some features to turret-lathes or bar-working machines of the type wherein a plurality of tools are mounted upon a turret and are brought into position to operate upon the work in any predetermined order.

The form of my invention which is illustrated upon the drawings is provided with a turret of the barrel type mounted to revolve upon an axis parallel to the axis of the work-spindle, and the tools are mounted on the faces of independent slides movable on ways on the turret. As each slide comes to operative position it is engaged with actuator mechanism consisting of a wheel or drum having adjustable and interchangeable cams and a sliding bar engaged at one end by the cams in succession and equipped at its other end with means to engage the slides successively. Mechanism is likewise provided for securing a differential movement of the cam-carrying drum or wheel, whereby the movement of the tool-slide away from and toward operative position will be effected rapidly and its movement during the time that the tool is operating will be relatively slow. The slow movement of the slides may be varied, however, by the employment of different cams whose operative edges are at a greater or less angle or pitch relatively to the drum. The turret is rotated with a step-by-step movement by "Geneva stop mechanism," so called, and is locked after each movement to hold it securely during the actuation of a slide thereon. The mechanism referred to consists of a radially slotted or grooved wheel attached either mediately or directly to the turret and a rotating disk or arm having a pin or projection to enter the slots or grooves in succession once for each rotation, and thereby impart a partial rotation to the turret. The disk or arm is normally withdrawn to prevent the engagement of the pin or projection with the grooved or slotted wheel and is governed by suitable stop mechanism by means of which the pin or projection may be caused to enter a slot or groove in the wheel at any desired time to effect the partial rotation of the turret. This same stop mechanism also governs the locking-pin which normally locks the turret against movement and provides for the unlocking of the turret prior to the engagement of the pin or projection with the grooved or slotted wheel. The speed or direction of rotation of the work-carrying spindle is varied by suitable stop mechanism rotating in unison with the cam-carrying drum for the turret-slides, said mechanism including a belt-shipper and a wheel having adjustable cam-stops thereon for operating said shipper. There are likewise devices for opening and closing the chuck and for feeding the work, these being governed by stop mechanism consisting of cams on one or more carriers rotating synchronously with the drum. The cam-carrying drum and the cam or stop carriers for the belt-shipper, the chuck opening and closing mechanism, and the stock or work feeding mechanism all rotate synchronously or in unison, as stated, to effect the various operations of the lathe in proper sequence.

In addition to the features referred to the machine is possessed of many others, to which reference is more specifically made in the appended specification.

Figure 2:
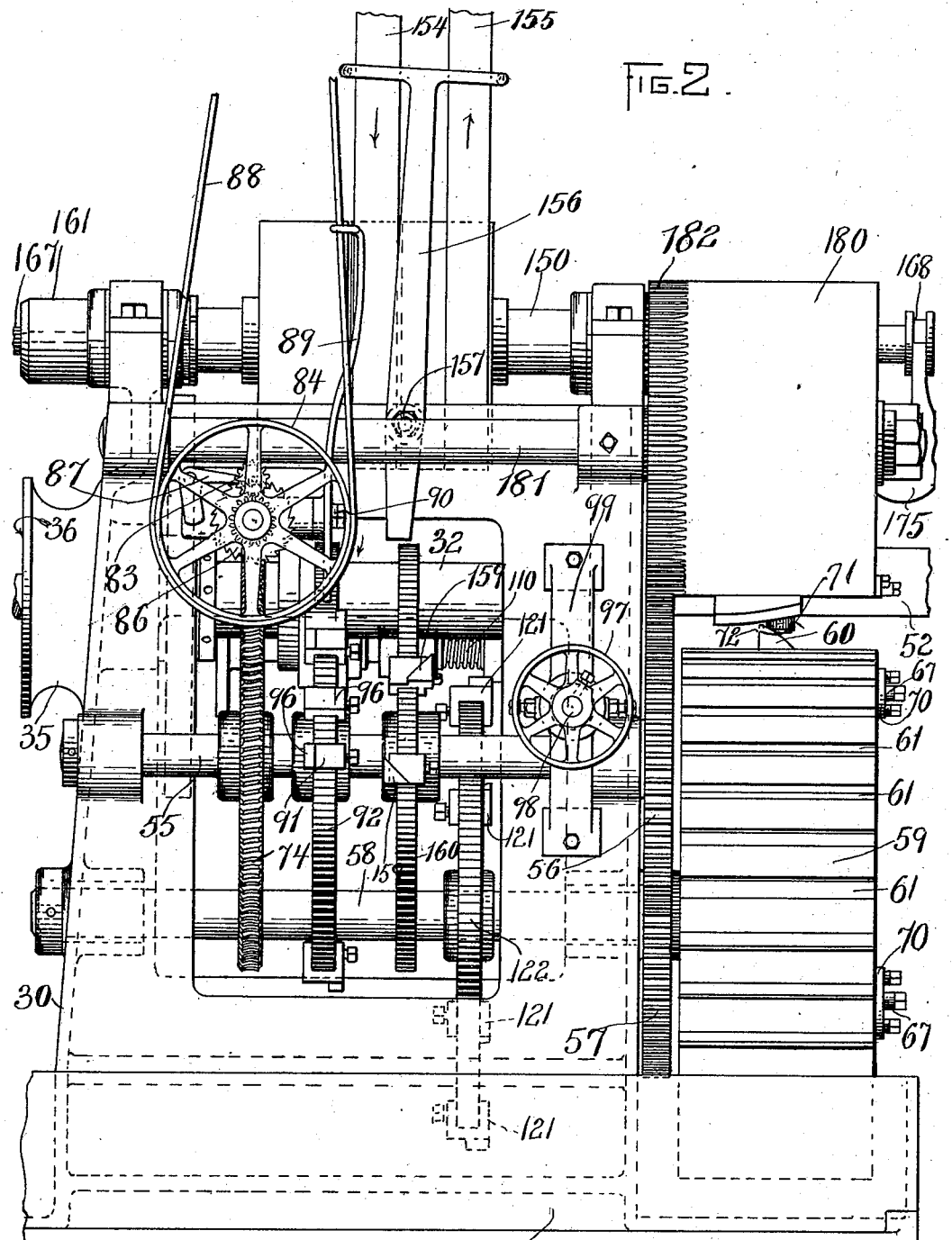
Figure 3:
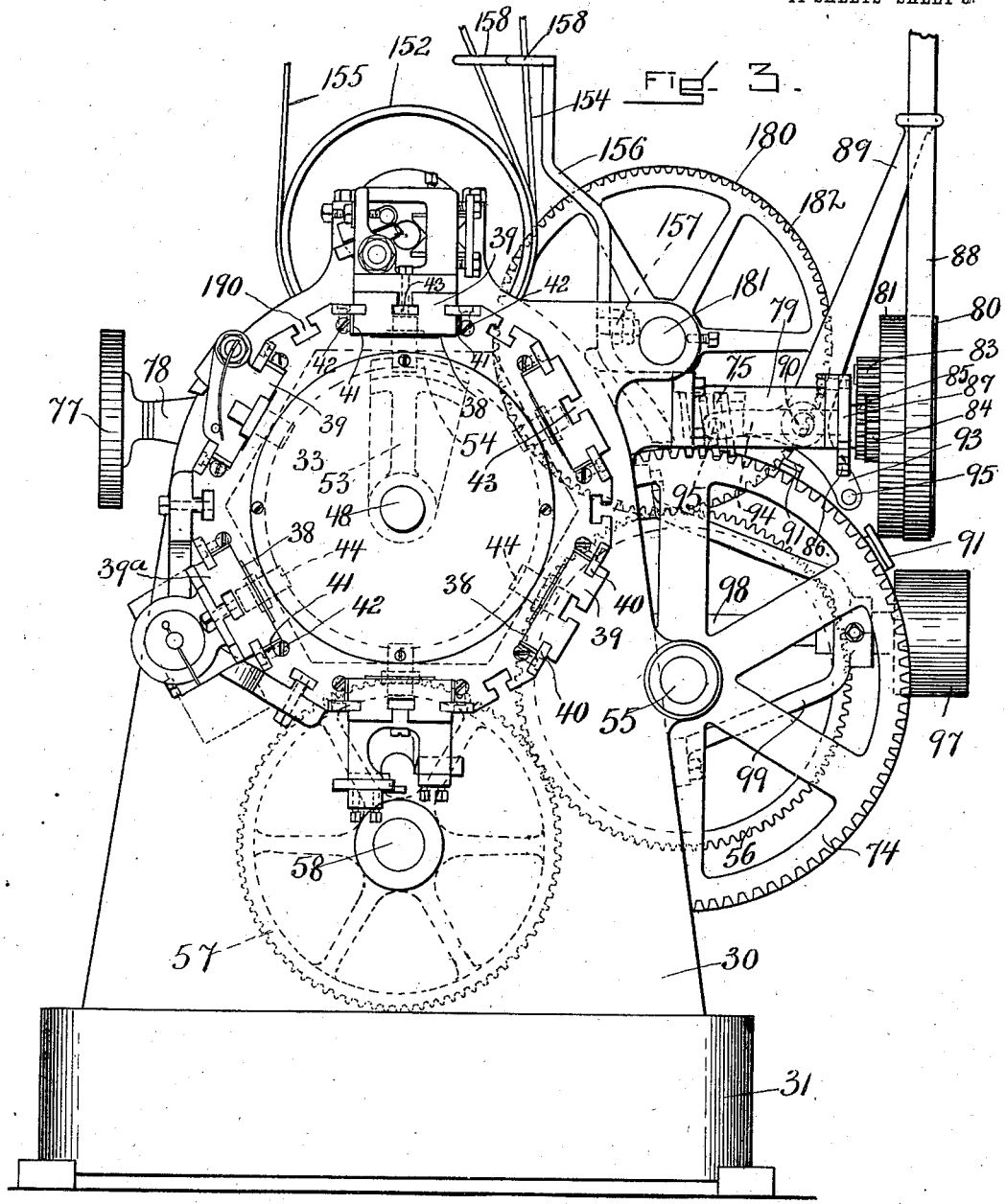
Figure 4:
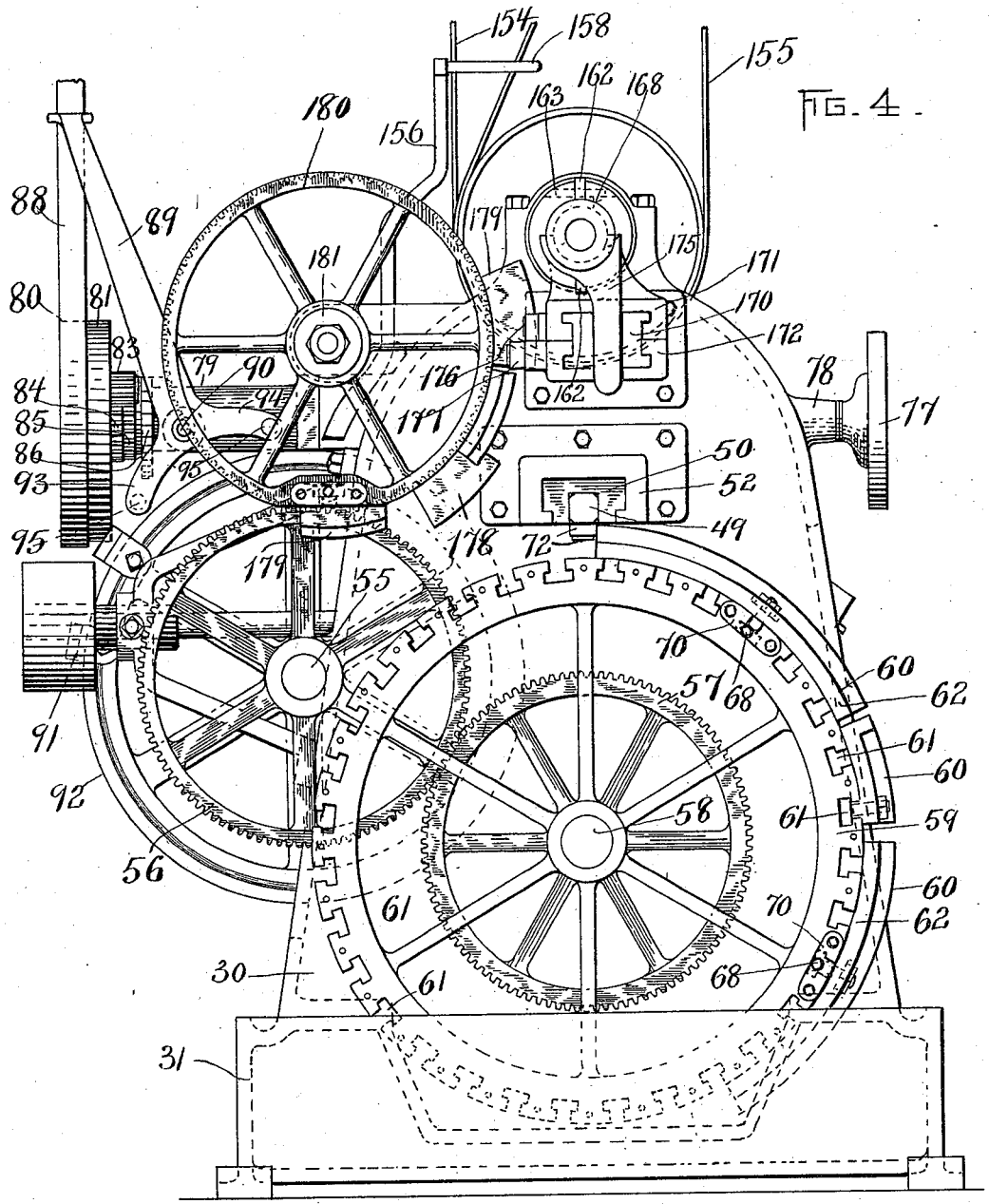
Figure 5:
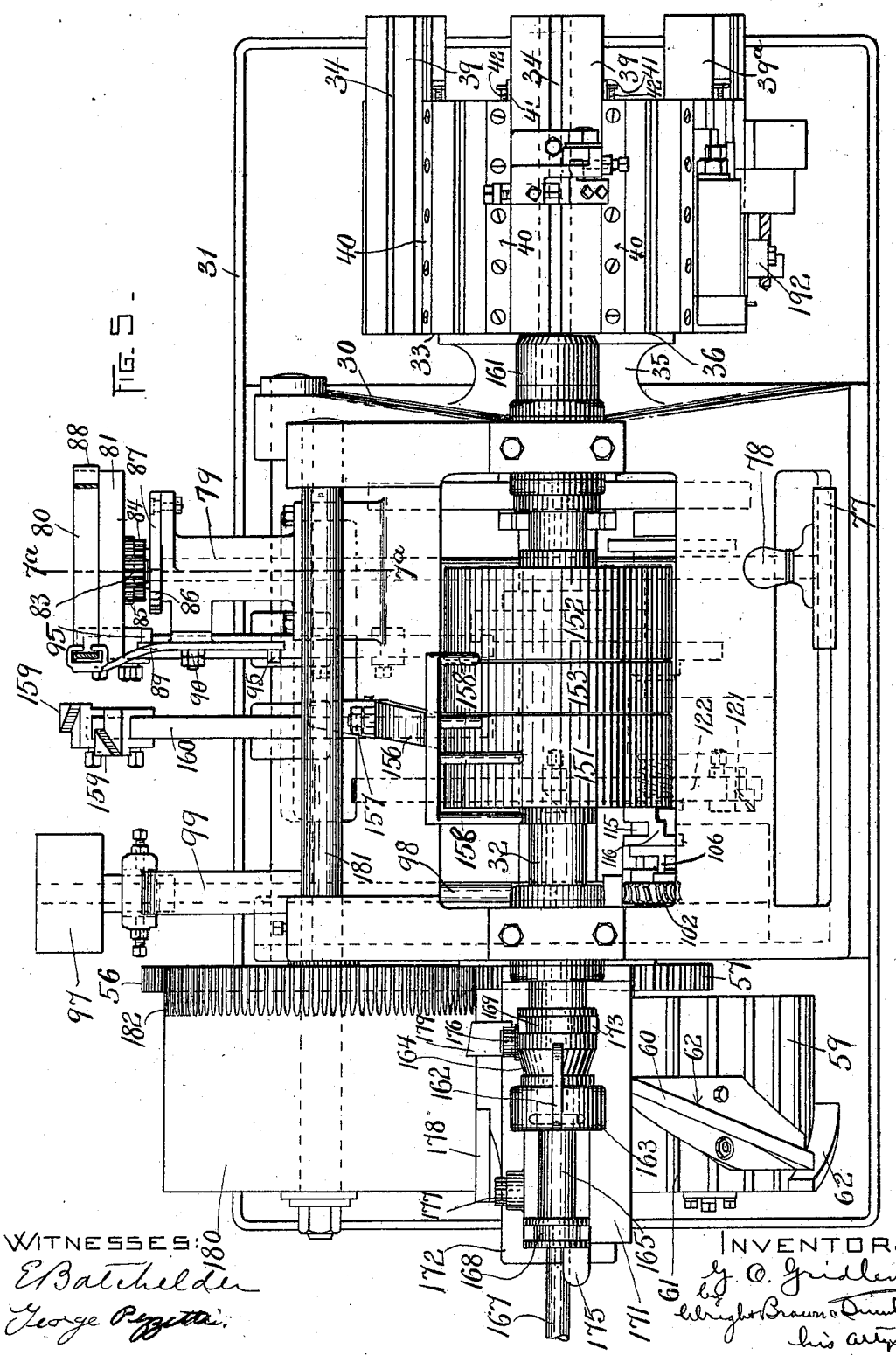

Referring to the accompanying drawings, Figure 1 represents a front elevation of a bar-working machine embodying my invention. Fig. 2 represents a rear elevation of the same with the turret broken away. Fig. 3 represents an elevation of the turret end of the machine. Fig. 4 represents an elevation of the opposite end of the machine. Fig. 5 represents a plan view of the machine. Fig. 6 represents a longitudinal section therethrough. Fig. 7 represents a section on line 7 7 of Fig. 6. Fig. 7$^a$ represents a section on the line 7$^a$ 7$^a$ of Fig. 5. Fig. 8 represents a horizontal section through the machine with the superstructure removed. Fig. 9 represents a section on the line 9 9 of Fig. 6 looking in the direction of the arrow. Figs. 10, 11, and 12 show in detail the locking mechanism for the turret. Figs. 13 and 14 illustrate portions of the turret-rotating mechanism. Figs. 15, 16, 17, and 18 represent details of construction.

On the drawings, 30 indicates the frame of the machine, which may be cast integrally, as shown. It rests upon and is bolted to a hollow open base 31, which extends the entire length of the machine, as shown in Fig. 5. Journaled in bearings in the frame is the hollow spindle 32 of the barrel-shaped turret 33. As shown in Fig. 3, the turret is hexagonal in shape; but it will be readily understood that the number of its sides may be increased or diminished without affecting the spirit and scope of the invention. The rear end wall 34 of the turret rests against the flat end 36 of the bearing 35, on which the spindle is mounted, and means are provided, as will be explained, for coacting with the bearing to hold the turret against axial movement. The turret is formed on each of its flat sides with a groove or slideway 38 to receive a tool-slide 39, having provisions in their faces for the reception of tools adjustably placed thereon. The slides are held in the grooves by guide-bars 40, which enter grooves in the sides of the slides 39 and which are bolted to the flat faces of the turret. Between the sides of the slides and the walls of the grooves in which they are located are placed tapering gibs 41. Each gib has a slight depression to receive the head of an adjusting-screw 42, tapped into the end of the turret. The provision of these adjustable gibs enables compensation for wear of the parts, whereby the tool-slides may be held rigidly against lateral movement. Each tool-slide is itself provided with a groove 43, having undercut edges for the reception of the tool. To each slide is rigidly secured a pin 44, which projects radially inward through a slot 45 in the face of the turret. The outer end wall 46 of the turret is held removably in place by screws 47, and hence by removing said wall access may be had to the pins 44 to permit their removal in case of damage or to tighten them in case they become loosened.

Passed through the hollow spindle 32 is a slide-bar or actuator 48, relatively to which the turret is rotatable. The rear end 49 of the bar is squared, as shown in Figs. 4 and 6, and it is secured to a slide 50 by pins or screws 51 51. The slide 50 is adapted to travel in a guide 52, securely bolted to the left end of the machine. The slide and guideway are provided with means to securely hold the slide-bar 48 against rotation and also to prevent a lateral thrust of the rear end of the guide-bar when it is engaged by the cams, to be explained. Within the turret there is secured to the slide-bar an arm 53, having in its end a groove or open socket 54 to receive each pin 44 as the turret rotates step by step. The arm 53 is upright and in position to receive a pin 44 of the slide which is in the vertical plane of the work-carrying spindle. Consequently it is seen that the slides 39 are engaged by the slide-bar or actuator one at a time in succession and that the reciprocatory movement of the slide-bar or actuator affects only the slide with which it is connected, the other slides remaining inoperative at the outer ends of their stroke. As has been stated, the actuator or slide-bar 48 is reciprocated by cams, and I will now proceed to describe this cam mechanism, together with the mechanism which transmits power thereto.

Referring now to Fig. 2, which shows the machine in rear elevation, it will be observed that on the rear side of the frame is journaled a shaft 55, which carries on its end a larger gear 56. This last-mentioned gear engages a gear 57 of the same size and having the same number of teeth. The said gear 57 is rigidly secured to a shaft 58, which is journaled in the frame directly below the turret-spindle 32, as shown in Fig. 6. On the shaft 58 is rigidly secured a carrier 59, having removable and interchangeable cams 60. The carrier 59 is provided in its periphery with a large number of parallel grooves 61, whose edges are undercut, as shown in Figs. 4, 17, and 18. Each cam 60 consists of a base 62, adapted to fit snugly upon the periphery of the carrier, and a flange or ridge, which forms the cam proper. The under face of the base of each cam is formed with a projection 64 to extend down into the groove 61. In said projection and base are bolts 65, suitably secured by nuts on the threaded upper ends thereof, the heads of which engage the undercut edges of the groove. The heads of the bolts are also provided with threaded apertures 66 to receive a long threaded screw 67, located in the groove 61. The end of this screw-bar 67 is squared or otherwise provided for the reception of a turning-tool, as indicated at 68, and it is provided with a non-threaded portion 69, which is journaled in a small plate 70, attached by bolts to the outer end of the carrier. The base of each cam may be provided with other projections to extend into the grooves 61, so that the cams will be held at several points; but the provision of the screw 67 provides for the accurate adjustment of the cams longitudinally of the axis of the carrier.

The feeding-cams are generally quite long and the withdrawing-cams relatively short. The angle of the withdrawing-cams is usually the same, being such that the tool-slide may be rapidly withdrawn. The feeding-cams, however, are generally furnished to provide for three different speeds of travel of the tool-slide—to wit, slow, fast, or medium—and as they are interchangeable they may be placed upon the carrier in any desired combination, according to the nature of the work or of the operating-tools. The operative portion of each cam as it comes to working position engages a roll 71, journaled on a pin 72, passed through the end 49 of the slide-bar 48. The nut 73, which holds the pin in place, is located in an aperture in the slide 50, as shown in Fig. 6. It is apparent from this description that as the cam-carrier rotates the cams are caused to successively engage the roll 71 and move the slide-bar or actuator 48 backward or forward, as the case may be, to move the tools first in one direction and then in the other.

The shaft 55, to which previous reference has been made, is provided with a worm-wheel 74, with which is engaged a worm 75 on a shaft 76, extending from front to rear of the machine, as shown in Fig. 7. On the front end of the shaft is secured a hand-wheel 77, by which it may be rotated manually. One end of the shaft is mounted in the bearing 78 in the front portion of the frame, whereas the rear end of the shaft is journaled in a bearing-bracket 79, attached to the rear portion of the frame. Upon the exterior rear end of the shaft are placed two belt-pulleys 80 81, the former of which is keyed to the shaft, while the latter is loose thereon. The said pulley 81 carries a crank-pin 82, on which is loosely journaled a pinion 83, intermeshing with two pinions 84 85 on the shaft 76. The pinions are substantially the same in size; but that at 85 is provided with one less tooth than that at 84. The pinion 84 is keyed or pinned to the shaft 76, while the pinion 85 is secured upon the hub of a ratchet-wheel 86, mounted loosely on said shaft. The weighted pawl 87 is pivoted upon the bearing-bracket 79 and normally engages the ratchet 86 to hold it against rotation in reverse direction, although it permits the ratchet to rotate freely when the belt is engaged with the pulley 80.

On shipping the belt to the pulley 81 the shaft 76 is caused to rotate very slowly, since the pinion 84 is advanced one tooth for each complete revolution of the pinion 83 and the pulley 81; but when the belt is moved to the pulley 80 the shaft 76 is caused to rotate once for each rotation of the pulley, thus providing for the slow movement of the cam-carrier for moving the tool-slide when the tool is engaged with the work and for rotating the cam-carrier quickly during the time that the tool is being withdrawn or is being carried forward toward operative position.

The belt for the two pulleys is indicated at 88 and adapted to be shifted by a shipper 89, fulcrumed at 90 and having its lower end bifurcated to provide two arms 93 94, each of which carries a pin or projection 95 and adapted to be engaged alternately by a series of cams 91, secured adjustably upon the cam carrier or wheel 92 on the shaft 55. The cams are so formed as to engage first one projection 95 and then the other, and to this end the said projections 95 extend in opposite directions and the cams 91 91 having their operative portions 96 located on opposite sides of the carrier, as shown in Fig. 2.

To rotate the turret, I employ an independent mechanism driven by a separate belt. In the last-mentioned figure it will be observed that there is a pulley 97 on the end of a transverse shaft 98, which extends into the machine, as shown in Fig. 9, it being journaled in the brackets 99 and 100. On its front end this shaft is provided with a worm 101, which engages and drives a worm-wheel 102, loose upon a shaft 103, journaled in the frame in front of and slightly above the shaft 58. The worm-wheel 102 is held against movement axially of the shaft 103 by a finger 104. (See Fig. 8.) On the shaft 103 is pinned a wheel 105, having axially-extending teeth 106, which are adapted to slide in complemental apertures in the worm-wheel 102 to effect a continuous engagement between the said wheel and the said worm-wheel, so that they will be caused to rotate together, while permitting one to move axially relatively to the other.

The shaft 103 is journaled in bearings (indicated at 107 108 109) all secured to the frame of the lathe, and it is adapted to reciprocate longitudinally therein, as will be explained. Between the bearing 108 and the wheel 105 there is a spring 110, which tends to move the shaft to the left. To move the shaft to the right, there is a vertically-movable pin 113, adapted to be forced outwardly by a spring 114 into a cam-groove 115 in the cam-wheel 105. The shape of this cam-groove is shown in Fig. 8, and it is such that when the pin is permitted to enter it the walls of the groove bear against the pin and force the shaft 103 to the right until the pin rides up upon the raised portion 116 of the cam, at which time the pin is locked against movement and the spring 110 is free to move the shaft 103 to the left. The means for locking the pin is shown in Fig. 14, and it consists of a slide 117, having the projection 118, adapted to enter a notch 119 in the pin 113. A spring 120 bears against the end of the slide to move it toward operative position. The end of the slide 117 projects into the path of a series of cams 121, secured adjustably upon the periphery of a carrier or cam-wheel 122, mounted upon the shaft 58, which, it will be remembered, carries the cam-carrier 59, by which the turret-slides are actuated. Hence the action of the stop mechanism just described depends upon the rotation of the shaft 58—that is, the stop mechanism for the turret-rotating mechanism is controlled by the tool-slide-operating mechanism.

Rigidly secured upon the hollow turret-spindle 32 is a disk or member 124, having a series of radial grooves equal in number to the tool-slides 39 upon the turret. These grooves are open at the ends to receive a pin or projection 125 on a wheel, disk, or rotating member 126, rigidly secured to the shaft 103. These two members constitute what is termed "Geneva stop mechanism," the action of which is well known. Inasmuch as there are six grooves for the reception of the pin 125, the turret is rotated one-sixth of a revolution each time the pin 125 enters one of the grooves. The operation of this mechanism and the relation of the parts are shown in Fig. 7.

Normally, as has been stated, the shaft 103 is held by a spring to the left, so that it is free to rotate without the pin 125 entering a groove in the disk 124; but when a cam 121 engages the slide 117 and moves it sufficiently to permit the pin 113 to rise and enter the cam-groove 115 in the cam 105 the shaft 103 is forced to the right to bring the projection or pin 125 into alinement with a groove in the disk 124, whereby the rotation of the shaft 103 causes the rotation of a turret one step, and upon the completion of the rotation of the shaft 103 the pin is disengaged from the groove and is locked in inoperative position, the shaft 103 being in the meantime carried by the spring 110 to the left to prevent the pin 125 from entering a groove in its next rotation.

As has been previously stated, the turret is normally locked against rotation, and I will now describe the locking mechanism and the means for actuating and moving it to inoperative position to permit the actuation of the turret.

Having reference now to Figs. 6, 10, 11, and 12, it will be observed that the turret-spindle is beveled to receive a stop-wheel 128, having as many notches in its periphery as there are slides upon the turret. Each notch 129 is formed in a hardened-steel block 130, secured in a socket 131 in the periphery of the wheel by screws 132. The hub of the wheel 128 is internally beveled, and the wheel is forced upon the beveled portion of the spindle 32 by a threaded nut 133. Passed through the wheel 128 are screws 134, which bear against a collar 135, encircling the bushing 136 and bearing against the inner end of the bearing 35. The provision of these screws and the collar permits the end wall 34 of the turret to be drawn with considerable pressure against the face 36 of the bearing to thereby hold the turret against loose movement. Placed in a bracket 140, secured to the inside end wall of the frame, is an index or locking pin 141, which is adapted to slide between gibs 142 143, one of which is beveled, so that it may be adjusted to compensate for wear. A leaf-spring 144 bears against the end of the pin to force it inward to enter the notch 129 in each block 130 in the wheel 128. The bracket 140 supports the bearing 109 for the shaft 103. In a slideway formed in said bearing is placed a slide 145, which is connected by a pin 146 with the locking-pin 141. The pin 146 passes through a slot 147, formed in the bracket 109, as shown in Fig. 11. The slide 145 is adapted to be engaged by a cam 148, rigidly secured upon the shaft 103 when the said shaft is moved to the right by the mechanism previously explained. This cam is so shaped and it is so related to the Geneva stop mechanism that when the shaft 103 is first moved to the right the raised portion of the cam forces back the slide 145 to free the index-pin from the notch 128 before the Geneva stop mechanism imparts a partial rotation to the turret, and before the said partial rotation of the turret is completed the slide 145 drops from the swell on the cam to permit the locking-pin to enter the notch when the latter registers therewith. As soon as this occurs the shaft 103 is moved to the left by a spring, as previously explained, and the continued rotation of the shaft 103 has no effect upon it until the slide 117 is again tripped by the cam on the cam-carrier 122. It is evident from this description that while mechanism independent of the mechanism for actuating the tool-slide is employed for rotating the turret yet it is controlled by the said tool-slide-actuating mechanism.

I will now proceed to describe the work carrying and rotating mechanism, together with the means for feeding the work and the means for opening and closing the chuck. The spindle is indicated as a whole at 150, and it is mounted in bearings upon the top of the lathe directly over the turret-spindle 32. It carries the two loose pulleys 151 152 and the fast pulley 153. There are two belts 154 155, either of which is adapted to be engaged with the fast pulley 153. Said belts move in opposite directions, as indicated by the arrows in Fig. 2, so that in order to change the direction of rotation of the spindle it is necessary to shift the belts.

The shipper is shown in Fig. 2 and is indicated at 156, being fulcrumed at 157. It is provided with forks to engage the belts, as indicated at 158. (See Fig. 5.) The lower end of the shipper lies in the path of a plurality of cams 159, adjustably secured upon the periphery of a cam-carrier 160, fast upon the shaft 55. When the said shaft rotates, the shipper is moved in one direction or the other as it is engaged in succession by the cams 159.

The chuck is indicated as a whole at 161, and it is adapted to be opened and closed by any suitable means extending through the spindle and operated by the dogs 162 162, pivoted upon the collar 163. Secured upon the exterior of the spindle there is a conical sleeve 164, which is free to rotate with the spindle, but is adapted to slide relatively thereto. When moved in the direction of the arrow in Fig. 6, the beveled end of this collar engages the dogs 162 and closes the chuck, and when said collar is moved in the opposite direction the chuck is opened by the usual means (not shown) to permit the feeding of the work. Located within this spindle 150 is a bushing 165, which frictionally engages the bar or work 167. This bushing is free to slide within the spindle, so as to feed the work forward by its frictional engagement therewith, and after the chuck closes upon the work the reverse movement of the bushing is relatively to the work, as the latter is incapable of reverse movement at that time. The end of the bushing is formed with a grooved collar 168, there being also a groove 169 in the collar 164. To move the bushing and the collar, I provide the following mechanism: Extending to the left from the end of the lathe is a guide 170, upon which are adapted to reciprocate two slides 171 172, respectively. The slide 171 has a yoke 173, extending into engagement with the groove 169 of the collar 164, and the slide 172 has a yoke 175, entering a groove 168 in the bushing 165, these two slides being free to move independently of each other. The slide 171 is provided with the roll 176, and there is a similar roll 177 on the slide 172. The roll 177 projects considerably to the rear beyond the roll 176, but they are both in position to be engaged by two sets of cams 178 179, respectively, secured upon a cam-carrier 180, mounted upon a shaft 181, journaled in bearings in the rear of the lathe. This carrier is in the form of a drum, and it has the gear-teeth 182, intermeshing with the gear 56, to which it is similar in size and number of teeth, so that it rotates in unison therewith. There are two cams in each of the sets 178 179, and they are so arranged that the stock-feeding slide is first moved to the left, the chuck is opened, the stock-feeding slide is moved to the right to feed the stock, after which the chuck is closed, this taking place once for each rotation of the cam-carrier 180. The relative location of these cams is shown in Figs. 4 and 9. The feeding of the stock may take place during an initial rotation of the turret to bring the first tool into position after a cycle of operations has been completed. It will be further observed that this feeding will likewise take place when the shaft 55 is being driven at high speed—that is to say, when the belt is engaged with the pulley 80.

It is unnecessary to explain in detail the operation of the machine, as it is set forth in the description of the various parts.

There are several features about the machine to which I wish to direct attention.

First. The machine is very compact and requires but small floor-space.

Second. The turret is so located that there is no long overhang of the tool, and the tools can be brought well up under the work upon a practically solid base.

Third. The tool-slides are positively actuated and their speed of movement may be increased or decreased, as desired.

Fourth. A class of tools may be employed in connection with the turret which are incapable of use in lathes of other types. For instance, I am enabled to overcome the lateral play of the boring-bit. It will be observed that between each of the flat faces on the turret there is a groove 190, the edges of which are undercut. These grooves lie parallel to the path of movement of the slides 39, and they are adapted to receive portions of the tools which project beyond the slides. Thus it will be observed in Fig. 1 that upon the face of the slide 39ª there is a boring-bit 191. This bit passes through a bridge 192, which spans a space between the groove 190 on one side of this tool and the groove 190 on the opposite side of the tool. The provision of this bridge holds the tool against vibratory movement during the feeding of the bit into the work. This is but one instance of the various tools that may be employed; but it will be easily understood that in the groove 190 may be placed templets for causing a tapering of the work, &c.

Fifth. The provision of the adjustable cams on the cam carrier or drum provides for an accurate feeding of the tool, whereby a shoulder may be accurately formed or located upon the work. The adjustment of the cams is effected by means of the screw-bars located in the slots of the drum to move the cams axially of the drum, and so far as I am aware I am the first to have provided a cam-carrier of the character referred to with cams which are adjustable axially thereon to vary the extent of movement of the tool-slides without a variation in the time period of said movement. I prefer in most cases to employ the particular means which I have described for adjusting the cams, since it leaves the periphery of the carrier free and without obstruction other than the cams themselves. The bolts with which the screw-bar is engaged not only coact with the latter to adjust the cams, but also furnish the means for rigidly securing the cams to the carrier after adjustment, thus performing, as it were, two functions.

There are many parts of my invention, as described, which may be employed upon manually-operated lathes as well as upon those which are actuated and controlled automatically, and unless otherwise specified in the claims their location upon a manually-operated machine will not carry them beyond the boundaries of my invention.

I have employed the word "turret" for lack of a better generic term, and, unless otherwise specified or described in the claims, I desire to have the term construed as including a movable element on which may be located a plurality of independent tool-slides adapted to be actuated successively or in predetermined order by the actuator, this element being so located in the transverse planes of the work that it furnishes a solid base for the tool-slide practically throughout the entire travel of the tool, whereby the tool is rigidly supported without overhang, even when brought into close proximity with the end of the chuck.

I have hereinbefore referred to the tool-slides as being freely movable, and in explanation thereof it may be stated that the slides are adapted to be moved in their guideways with reference to the work in contradistinction to having the tools affixed directly to a carrier or turret on which they are not operatively movable. I have also referred to several elements as "tools," and I desire to include by that term, unless otherwise expressed, not only the particular element which actually engages the work as the cutter or the bit, but also those parts in which the cutter or bit is mounted and which I have referred to as the "tool-holder."

I do not limit myself to the precise construction of the machine as illustrated and described, for it will be evident that various changes may be made in the machine without departing from the spirit and scope of the invention.

Having thus explained the nature of the invention and described a way of constructing and using the same, although without attempting to set forth all of the forms in which it may be made or all of the modes of its use, I declare that what I claim is—

1. A turret-lathe comprising a work-carrier, means for rotating said work-carrier to rotate the work about its own axis, a turret having one end in substantially the plane of the end of the work-carrier and having axially-extending guideways on its periphery, tool-slides freely movable on said guideways, means for rotating said turret with a step-by-step movement, whereby said slides are brought successively to operative relation to the work in said carrier, means for attaching tools and their holders to said slides between the extremities thereof, and means for longitudinally moving said slides and the tools thereon to cause said tools to operate on the rotating work in said carrier, said parts being constructed and arranged as described whereby the strain of the tool on its holder is borne by the turret throughout the travel of the tool.

2. A lathe comprising a rotary work-holding spindle, a turret rotating on an axis parallel to the axis of the spindle, a plurality of movable slides on the periphery of the turret, provisions in the faces of said tool-slides for the reception of tools and their holders, and means for moving said slides.

3. A lathe comprising a rotary turret, a plurality of elongated slides on the periphery of said turret longitudinally movable in paths longitudinal of the axis thereof, said tool-slides having provisions between their ends for the reception of a tool and its holder, and means for moving said slides.

4. A lathe comprising a work-carrier which is axially stationary, means for rotating said work-carrier to rotate the work on its own axis, a turret having on its periphery a plurality of guideways longitudinal of its axis, slides freely movable on said guideways, means for moving said slides toward and from the work-carrier, and provisions for readily securing the non-rotary tools and their holders on the faces of said slides.

5. A lathe comprising a rotary work-holding spindle adapted to hold the work projecting beyond the end thereof, means for rotating said holder to rotate the work on its own axis, a turret having guideways on its periphery, freely-movable slides on said guideways, means for rotating said turret on an axis out of alinement with the axis of said spindle to bring said slides successively into operative relation to the work in said spindle, means for securing tools and their holders to said slides, and means for moving said slides and the tools into the transverse planes of said spindle and the work carried thereby.

6. A lathe comprising a rotary turret, and a plurality of elongated slides on the periphery of said turret longitudinally movable in paths parallel to the axis thereof, each tool-slide having provisions from end to end for the reception of a tool at any point thereon.

7. A lathe having a work-spindle, means for rotating said spindle to rotate the work about its own axis, a plurality of slides each adapted for the reception of a tool and its holder, and a turret having on its periphery guideways for the said slides, each of said guideways affording a base for receiving the thrust of the tool and the tool-slide throughout the extent of the travel of the tool, means for rotating said turret to successively bring said slides into parallelism with but out of axial alinement with the work and the work-spindle, and means for moving said slides to move the tool into engagement with the work and also to move it during its engagement with the work.

8. A lathe having a work-carrier, a turret rotatable on an axis longitudinal of but out of alinement with the axis of the work-carrier, a series of independent tool-slides on the periphery of the turret, means for imparting a step-by-step movement to the turret, and means for moving each slide past the end of the work when the turret reaches a predetermined position.

9. A lathe having a turret, a plurality of tool-slides on the periphery of the turret movable in paths parallel to the axis of said turret, each slide having an exposed longitudinal face, means for adjustably securing a tool and its holder on each face, means for imparting a step-by-step rotation to the turret, and means for operating each slide independently of the others.

10. A lathe having a turret, a series of slides axially movable on the periphery of said turret, an actuator located within said turret and having means for interlocking with each slide as the turret reaches a predetermined position, and cam mechanism for moving said actuator.

11. A lathe having a rotary turret, a series of slides axially movable on said turret, a non-rotary actuator within said turret for operating said slides and having mechanism for interlocking with said slides in succession, and mechanism for moving said actuator.

12. A lathe having a turret with tool-slides mounted on its periphery to move axially thereof, a reciprocatory slide-bar in alinement with the axis of said turret, and means on said bar for interlocking with said slides in succession to actuate them.

13. A lathe having a turret with tool-slides mounted on its periphery to move axially thereof, each tool-slide having an exposed face for the reception of a tool thereon, a hollow spindle for rotatably supporting said turret, and a slide-bar passing through said spindle to actuate said tool-slides.

14. A lathe having a turret with tool-slides mounted on its periphery to move axially thereof, each tool-slide having a projection extending into the interior of said turret, and an actuator having a complemental projection to interlock with the projection on each of the tool-slides.

15. A lathe comprising a frame, a rotary work-carrier, a turret having a hollow spindle journaled in said frame, with its axis longitudinal of the work-carrier, said turret having at its inner end a flat face bearing against a flat surface on the frame, a plurality of tool-slides movable axially of said turret in ways formed on its periphery, and means for moving said slides.

16. A lathe comprising a frame, a work-holding spindle, a turret journaled in said frame, and having peripheral ways parallel to said spindle, said turret having at its end a face bearing against a surface on the frame, and a plurality of tool-slides independently movable in said ways.

17. A lathe comprising a frame, a work-holding spindle, a turret journaled in the frame and having at its end a face bearing against a surface on the frame, a plurality of tool-slides independently movable on the periphery of said turret in paths parallel with the axis of the work-holding spindle, and an adjustable member adapted to hold the turret-face against the surface on the frame.

18. A turret-lathe comprising a rotary spindle and chuck for the work, a rotary turret having guideways on its periphery, a journal-bearing for the turret of a diameter less than the diameter of the turret, tool-slides freely movable on the periphery of the turret, means for reciprocating said slides, and means for attaching tools and their holders to said slides, so that the tools are located between the ends of the turret, substantially throughout the extent of their movement.

19. A lathe comprising a work-carrying spindle, a polygonal turret having on its side faces guideways parallel with the work-carrying spindle, tool-slides adapted to receive tools and their holders and freely movable on said guideways, and a journal-bearing for said turret which is less in diameter than the diameter of said turret.

20. A lathe comprising a rotary turret having independently axially movable tool-slides mounted on its periphery, each tool-slide having its exposed longitudinal face for the reception of a tool, an actuator for said slides, arranged in alinement with the axis of the turret, a rotary carrier, and a plurality of cams on said carrier for successively engaging and operating the actuator.

21. A lathe comprising a turret having axially-movable tool-slides mounted on its periphery, a sliding actuator for said slides arranged in alinement with the axis of the turret, a rotary carrier having its axis parallel to the axis of the turret, and cams on said carrier to operate the actuator.

22. A lathe comprising a turret having axially-movable tool-slides on its periphery, an actuator having means for positively interlocking with said slides and being arranged in alinement with the axis of the turret, and a rotary carrier having a series of cams for positively reciprocating said actuator.

23. A lathe comprising a reciprocatory tool-slide, a carrier having its axis parallel to the path of movement of said slide and having a peripheral groove extending in the direction of its axis, a cam on said carrier to actuate said tool-slide, said cam having a tongue adapted to enter said groove whereby the said cam is prevented from twisting on said carrier, and means for adjusting said cam bodily along said groove.

24. A lathe having a tool-slide adapted to reciprocate, a projection adapted to be directly connected to said slide to move synchronously therewith, a rotary carrier having its axis parallel to the path of movement of said tool-slide, and cams on said carrier for directly engaging said projection to feed the slide, said cams being bodily adjustable axially thereof to vary the length of feed of said slide without varying the time period or rate of speed of said feeding movement.

25. A lathe comprising a reciprocatory tool-slide, a carrier whose axis is parallel to the path of movement of said slide having a series of axial guideways, a projection adapted to be connected directly with the tool-slide to move it synchronously therewith, cams mounted on said carrier and arranged to directly engage said projection to actuate said slide, said cams having guides adapted to coact with the axial guideways on said carrier and a screw in threaded engagement with each cam for adjusting the cam axially in both directions on the said carrier.

26. A lathe having a reciprocatory tool-slide, a rotary carrier whose axis is parallel to the path of movement of said tool-slide having in its periphery a slot parallel to its axis, a screw located in said slot, a cam mounted on said carrier and having a threaded part engaged by the screw whereby said cam may be adjusted axially of said carrier, and a projection adapted to be directly connected to said feed-slide, and adapted to be engaged by said cam to directly actuate the feed-slide in synchronism therewith, said parts being all constructed and arranged whereby the adjustment of the cam axially of its carrier varies the extent of movement of the slide without varying the time period or the speed of the movement of the slide.

27. A lathe having a turret, a grooved member movable with the turret, a rotary member having a projection, a longitudinally-movable, normally rotating shaft carrying said rotary member, means for moving said shaft longitudinally in one direction to cause the engagement of the said projection with said grooved member, said means including a cam on said shaft, a pin immovable longitudinally of said shaft, and a device for effecting the engagement and disengagement of said cam and pin, and means for moving said shaft in the opposite direction to cause the disengagement of said projection with said grooved member.

28. A lathe having a turret with peripherally-mounted movable tool-slides, means for rotating said turret, a shaft having a carrier provided with cams for actuating said slides, a shaft geared to the carrier-shaft and having a worm-wheel, a shaft independent of the turret-rotating means having a worm for engaging and rotating said worm-wheel, differential power-transmitting mechanism for rotating said worm-shaft, and means on said worm-wheel shaft for controlling the operation of said differential power-transmitting mechanism.

29. A turret having guideways on its periphery, and tool-slides operable on said guideways in lines longitudinal of said turret, said turret having provisions between said slideways for the reception of accessories to the tools on the slides.

30. A turret having guideways on its periphery, and tool-slides operable on said guideways, said turret having provisions between said guideways for the support of accessories to the tools on the said slides.

31. A lathe, a work-holding spindle, a plurality of tools freely movable axially of the work-holding spindle, a turret having on its periphery provisions for supporting said tools, means for moving said tools relatively to said turret, and a bracket or support fixed on the periphery of said turret adapted to support one of the said tools which is movable relatively thereto.

32. A lathe having a work-holding spindle, a plurality of tool-slides moving axially of the work-holding spindle, a turret for supporting said tools, a bridge attached to said turret and extending across the path of a tool-slide to receive and support the tool thereon, and means for securing the ends of said bridge between said slides.

In testimony whereof I have affixed my signature in presence of two witnesses.

GEORGE O. GRIDLEY.

Witnesses:
  E. B. MAY,
  C. C. STECHER.